US008392278B1

(12) United States Patent
Badt

(10) Patent No.: US 8,392,278 B1
(45) Date of Patent: Mar. 5, 2013

(54) METHOD AND SYSTEM FOR SELLING ITEMS

(75) Inventor: Esther Badt, Herzelia (IL)

(73) Assignee: Konot Ltd, Herzelia, IL (US)

( * ) Notice: Subject to any disclaimer, the term of this patent is extended or adjusted under 35 U.S.C. 154(b) by 840 days.

(21) Appl. No.: 12/128,643

(22) Filed: May 29, 2008

Related U.S. Application Data

(60) Provisional application No. 60/940,734, filed on May 30, 2007.

(51) Int. Cl.
   *G06Q 30/00* (2012.01)
(52) U.S. Cl. .................................... 705/26.4; 705/26.1
(58) Field of Classification Search ............... 705/26.1, 705/26.4
   See application file for complete search history.

(56) References Cited

U.S. PATENT DOCUMENTS

| | | | | |
|---|---|---|---|---|
| 6,085,169 | A | | 7/2000 | Walker et al. |
| 6,108,639 | A | * | 8/2000 | Walker et al. ............... 705/26.2 |
| 6,356,878 | B1 | | 3/2002 | Walker et al. |
| 6,993,503 | B1 | * | 1/2006 | Heissenbuttel et al. ......... 705/37 |
| 7,099,840 | B1 | * | 8/2006 | Sullivan ........................ 705/37 |
| 7,363,246 | B1 | * | 4/2008 | Van Horn et al. ............... 705/80 |
| 7,577,582 | B1 | * | 8/2009 | Ojha et al. .................... 705/26.3 |
| 2002/0038281 | A1 | | 3/2002 | Lohmann et al. |
| 2003/0055744 | A1 | * | 3/2003 | Walker et al. .................. 705/26 |
| 2004/0024648 | A1 | | 2/2004 | Tatge et al. |
| 2005/0071222 | A1 | * | 3/2005 | Bigus et al. ................... 705/14 |
| 2005/0114223 | A1 | * | 5/2005 | Schneider ..................... 705/26 |

FOREIGN PATENT DOCUMENTS

WO   0033271 A2   6/2008

OTHER PUBLICATIONS

Hansell, Saul. Microsoft to Start Net Hotel-Pricing Service. Sep. 8, 1999. New York Times, Late Edition—Final ED, col. 01, p. 10.*

* cited by examiner

*Primary Examiner* — Scott Zare
(74) *Attorney, Agent, or Firm* — Oren Reches

(57) ABSTRACT

A method for selling an item, the method including: (a) displaying to a user a web page that includes multiple vendor representations; each vendor representation being representative of a vendor that was previously selected by the user; (b) receiving from a user a vendor selection indicator; (c) receiving from the user a requested price for purchasing an item from the selected vendor during a predetermined period of time that is defined by the selected vendor; (d) determining whether to proceed in a selling process of the item to the user during the predetermined period of time in response to the requested price and to an availability of the item at the predetermined period of time for selling by the selected vendor; and (e) selectively proceeding in the selling process in response to the determination.

14 Claims, 18 Drawing Sheets

530 displaying to the user of the web page dedicated to the selected vendor 531 displaying to the user decision related information

FIG. 1B 540 receiving from the user a requested price for purchasing an item from the selected vendor during a predetermined period of time that is defined by the selected vendor 541 receiving from the user a binding requested price 542 receiving from the user a non-binding requested price 543 receiving from the user a request for purchasing the item from the selected vendor during the predetermined period of time at a predetermined item price that is defined by the selected vendor 544 receiving requested prices from multiple users 545 receiving from the user an advance notification time for the non-binding requested price

FIG. 1C 560 determining whether to proceed in a selling process of the item to the user during the predetermined period of time in response to the requested price and to an availability of the item at the predetermined period of time for selling by the selected vendor 561 determining whether to proceed in at least one selling process of the item to at least one user of the multiple users 562 determining whether to proceed in a selling process of the item to a certain user in response to requested prices received from other users

FIG. 1D 570 selectively proceeding in the selling process in response to the determination 571 authorizing a charging of the user for the item by a sum responsive to the binding requested price 572 suggesting to the user to buy the item at the non-binding requested price

FIG. 1E 590 facilitating communication between the user and the selected vendor 591 enabling the selected vendor to offer the user a commercial offer, wherein the commercial offer is responsive to information previously received from the user

FIG. 1F

Contract creation screens

1. Main screen – My stores Sc-Square 001

2. Stores screen – all stores Sc-Shops 002

3. Line for specific item  Sc-line 003

4. Items/customer screen Sc-items 004

5. Screen for Visa payment Sc-Pay 005

Presenting information and other

6. Response screen Sc-Remarks 006

7. Notice-board screen Sc-Board 007

8. Game screen Sc-Quadroplol 008

Managing the store (Store screens)

9. Items/store screen Sc-itemshop 009

10. Management screen Sc-Shopreports 010

11. Information screen Sc-Information 011

12. "Konoshop" screen Sc-Konoshop 012

FIG. 3

| Stage | Goal | Related actions | Screens | Action |
|---|---|---|---|---|
| Customer visits store B on day K (before day T) | Buy product M in the future at a reduced price for day T | Takes from store B an identifying card with code of product M, hereinafter M. | | Deserts |
| Customer on the website | | | Sc-000 Sc-001/ Sc-002 | Register, enter ST Square, Sc-001/2 |
| Executing futures contract | Execute BM contract product M | Enter code of product M in window | Sc-001/ Sc-002 switches to Sc-003 | Activate BUY within store B and enter > code M or select product from list |
| | Contract details | Enter BM contract | Sc-003 | Completes fields and finally passes to status 1: open |
| Customer awaits approval | | Viewing and awaiting message according to procedure determined | Sc-001/ Sc-002 | |
| Store approves purchase | Provides contract details | Store enters details: price P, date T | Sc-007 | Passes to status 2: approved |
| Request for payment by given day | Obligation created | Awaits and views | | |
| Payment BM | Obligation created | Customer pays | Sc-005 | Status 3: paid |
| Customer in BM line | | Awaits and views | | |
| Customer receives message about availability of M on day T | Actual purchase of product | | | Status 4: message |
| Product M delivered or shipped | | Customer comes to store or awaits shipment | | Status 5: sent 5/1 sent 5/2 |
| | | Charge on day T. Leaves time for clarifications | | Status 6: closed |

FIG. 4

| Scenario | Code Product M match | Message given on day T | Product delivered on day T | Delivery dispatched to customer on day T | Customer approved delivery | Store charges on day T+X | Cancellation credit | Fairness score of store |
|---|---|---|---|---|---|---|---|---|
| 1. | + | + | + | | | + | | 1 |
| 2. | + | + | | + | + | + | | 1 |
| 3. | - | + | Rejected | | | + | Credit company | 2- |
| 4. | - | + | Rejected | | | | | 1- |
| 5. | - | + | | + | Rejected | + | Credit company | 2- |
| 6. | + | + | | + | Rejected | | Credit company | 1- |
| 7. | + | + | Rejected | + | Rejected | + | Credit company | 1 |
| 8. | + | + | | | | + | Credit company | 1 |
| 9. | + | - | | | | +* | | 2- |
| 10. | | - | | | | +** | | 1 |

FIG. 5

| Stage | Goal | Related actions | Screens | Action |
|---|---|---|---|---|
| Customer visits store B on day K (before day on which contract is executed) | Buy product M in the future at a reduced price | Takes from store B an identifying card with code of product M, hereinafter M. | | Deserts |
| Customer on the website | | | Sc-000 Sc-001/ Sc-002 | Register, enter ST Square, Sc-001/2 |
| Executing futures contract | Execute MM contract for product M | Enter code of product M in window E1 | Sc-001/ Sc- 002 passes to Sc-003 | Activate BUY within store B and enter > code M or select product M from list |
| | Contract details | Enter MM | Sc-003 | Completes fields and finally passes to status 1: open |
| Customer awaits approval | | Viewing and awaiting message according to procedure determined | Sc-001/ Sc-002 | |
| Store approves optional purchase | Confirms it has seen it | | Sc-007 | Passes to status 2: viewed |
| Customer receives message about availability of M on day H1 | Actual purchase of product | | | Status 3:message |
| Immediate payment H2 | | | | Status 4: paid |
| Delivery or shipment of product M | | Customer arrives at store or waits for shipment | | Status 5: delivered 5/1 shipped 5/2 H2 |
| | | Charge on day T + X. Leaves time for clarifications | | Status 6: closed |

FIG. 6

| Scenario | Code Product M match | Message given on day H | Delivery on day H | Shipped on day H | Shipment approved | Charge on day H+X | Cancellation credit | Website grade for store |
|---|---|---|---|---|---|---|---|---|
| 1. | + | + | + | | | + | | 1 |
| 2. | + | + | | + | + | + | | 1 |
| 3. | - | + | Rejected | | | + | Credit company | 2- |
| 4. | - | + | Rejected | | | - | | 1- |
| 5. | - | + | | + | Rejected | + | Credit company | 2- |
| 6. | - | + | Rejected | + | Rejected | - | | 1- |
| 7. | + | + | | + | | + | Credit company | 1 |
| 8. | + | + | | + | Rejected | + | Credit company | 1 |

FIG. 7

640 receiving from a vendor computer a conditional purchase request that includes: (a) a customer identification information; and (b) a requested price for purchasing an item from the vendor during a predetermined period of time that is defined by the vendor 690 facilitating communication between the user and the selected vendor 691 enabling the vendor to offer the customer a commercial offer, wherein the commercial offer is responsive to information of the conditional purchase request 650 creating a contract between the vendor and the customer, specifying at least the requested price, the predetermined period of time, and the type of contract 680 assigning a contract of a first user to a second user 6100 analyzing information received from the multiple customers, to provide marketing analysis 660 determining whether to proceed in a selling process of the item to the customer during the predetermined period of time in response to the requested price and to an availability of the item at the predetermined period of time for selling by the selected vendor 670 selectively proceeding in the selling process in response to the determination

600

FIG. 8A 640 receiving from a vendor computer a conditional purchase request that includes: (a) a customer identification information; and (b) a requested price for purchasing an item from the vendor during a predetermined period of time that is defined by the vendor 641 receiving from the vendor computer a conditional purchase request that includes a binding requested price 642 receiving from the vendor computer a conditional purchase request that includes a non-binding requested price 643 receiving from the vendor computer a conditional purchase request for purchasing the item from the vendor during the predetermined period of time at a predetermined item price that is defined by the selected vendor 644 receiving requested prices from multiple users 645 receiving from the vendor computer a conditional purchase request that includes an advance notification time for the non-binding requested price 646 receiving the conditional purchase request from a vendor computer that is associated with a vendor website

FIG. 8B 660 determining whether to proceed in a selling process of the item to the customer during the predetermined period of time in response to the requested price and to an availability of the item at the predetermined period of time for selling by the selected vendor 661 determining whether to proceed in at least one selling process of the item to at least one user of the multiple users 662 determining whether to proceed in a selling process of the item to a certain user in response to requested prices received from other users

FIG. 8C 670 selectively proceeding in the selling process in response to the determination 671 authorizing a charging of the customer for the item by a sum responsive to the binding requested price 672 suggesting to the customer to buy the item at the non-binding requested price

FIG. 8D 690 facilitating communication between the user and the selected vendor 691 enabling the vendor to offer the customer a commercial offer, wherein the commercial offer is responsive to information of the conditional purchase request

FIG. 8E

METHOD AND SYSTEM FOR SELLING ITEMS

FIELD OF THE INVENTION

The invention relates to methods, systems, and computer program products for selling items.

BACKGROUND OF THE INVENTION

Two well known problems in commerce are (a) surplus stock, wherein a vendor is not able to efficiently sell all the available stock, and is left with surplus commodity for which he is not able to receive reasonable compensation and have to pay significant amount for storage and/or maintenance; and (b) irreversible customer desertion, occurring when customers decide not to purchase the commodity even when desirable because of an unaffordable price, and can not be easily reached later for discount sales. Following are but few examples for realization of such problems.

As for products that are deserted in the store, stores remain with stock at the end of the season and there is no efficient way to sell the stock. Today there is no way to bring back to the store customers who deserted or to track their needs. The store has no information about the nature of deserting customers and the reason for deserting. Deserting a product is totally different from deserting the store and reasons might reveal the way to retain the customers.

Buying products and particularly fashion items is characterized by walking through stores and trying on until finding the item. With women the distances covered in the store and the number of stores visited until making the purchase is great. At the beginning of the season the percentage of store desertion is greater due to the price level and the vast selection. Because of the high percentage of desertion, the number of transactions closed within the stores visited is small. Despite the desertion the desired product remains in the customer's memory over time and he is sometimes interested in the item at a reduced price. Customers are prepared to compromise on the time of receiving the product. In the current situation, end of season sales present the customers with piles of items and do not present the customer with the items he searched for. At the end of the season the product is transferred to stock and the customer is again prevented from finding it.

As for seats that remain empty at events (e.g. plays, concerts, flights, etc.), Close to the date of the event suppliers remain with stock of tickets. They have no efficient manner to sell them and the event takes place with empty seats. Many buyers are interested in culture and are willing to see a play at the last minute call, likewise for flights. Some buyers are less picky about the type of play, type of concert or type of flight but limit the price that they are willing to pay. These buyers desert when faced with a high price and might return at "end of season" price if get the opportunity.

Despite the desertion, the desired product remains in the customer's memory over time and he is interested in the item at a reduced price. The current system does not bring together the customer and the supplier. At the time of the event, the empty seats are discarded, at great damage to profit.

As for customer effort in internet shopping, a customer who looks for products on the internet exerts considerable effort. The customer does not have sufficient tools to find and identify products that he saw in the store. The percentage of internet shopping is still low, with the purchase of fashion items and furniture far lower than the purchase of electrical appliances. For fashion items the store serves as an essential station in the purchase. The percentage of purchases on the store's designated website is marginal. Stores lose huge sales potential from buyers who do not find the items they wanted. Identifying store products in store web or in store catalogues requires imagination rather than simple code numbers. Complexity instead of simplicity makes shopper give up internet shopping especially fashion.

Therefore, there is a need for reliable and simple means of selling items.

SUMMARY OF THE INVENTION

A method for selling an item, the method including: (a) displaying to a user a web page that includes multiple vendor representations; each vendor representation being representative of a vendor that was previously selected by the user; (b) receiving from a user a vendor selection indicator; (c) receiving from the user a requested price for purchasing an item from the selected vendor during a predetermined period of time that is defined by the selected vendor; (d) determining whether to proceed in a selling process of the item to the user during the predetermined period of time in response to the requested price and to an availability of the item at the predetermined period of time for selling by the selected vendor; and (e) selectively proceeding in the selling process in response to the determination.

A method for selling an item, the method including: (a) receiving from a vendor computer of a vendor a conditional purchase request that includes: (i) customer identification information and (ii) a requested price for purchasing an item from the vendor during a predetermined period of time that is defined by the vendor; (b) determining whether to proceed in a selling process of the item to the customer during the predetermined period of time in response to the requested price and to an availability of the item at the predetermined period of time for selling by the selected vendor; and (c) selectively proceeding in the selling process in response to the determination.

A method for charging a payment card, the method includes: (a) authenticating received payment card information of a user; (b) receiving a requested price for purchasing an item from a vendor during a predetermined period of time; (c) determining whether to proceed in a selling process of the item to the user during the predetermined period of time in response to the requested price and to an availability of the item at the predetermined period of time for selling by the vendor; and (d) selectively charging an account of the user in response to the determination, wherein the charging follows a starting time of the predetermined period of time.

A computer readable medium having computer-readable code embodied therein for selling an item, the computer-readable code including instructions for: (a) displaying to a user a web page that includes multiple vendor representations; each vendor representation being representative of a vendor that was previously selected by the user; (b) receiving from a user a vendor selection indicator; (c) receiving from the user a requested price for purchasing an item from the selected vendor during a predetermined period of time that is defined by the selected vendor; (d) determining whether to proceed in a selling process of the item to the user during the predetermined period of time in response to the requested price and to an availability of the item at the predetermined period of time for selling by the selected vendor; and (e) selectively proceeding in the selling process in response to the determination.

A computer readable medium having computer-readable code embodied therein for selling an item, the computer-readable code including instructions for: (a) receiving from a vendor computer of a vendor a conditional purchase request that includes: (i) customer identification information and (ii) a requested price for purchasing an item from the vendor during a predetermined period of time that is defined by the vendor; (b) determining whether to proceed in a selling process in response to the requested price and to an availability of the item at the predetermined period of time for selling by the selected vendor; and (c) selectively proceeding in the selling process in response to the determination.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIGS. 1A through 1F collectively illustrate method 500 for selling an item, according to an embodiment of the invention;

FIG. 3 illustrates a list of some of the screens of a web-site, according to an embodiment of the invention;

FIG. 4 illustrates actions relating to binding contracts in the website, according to an embodiment of the invention FIG. 5 illustrates scenarios in executing binding contracts, according to an embodiment of the invention;

FIG. 6 illustrates actions relating to non-binding contracts in the website, according to an embodiment of the invention;

FIG. 7 illustrates scenarios in executing non-binding contracts, according to an embodiment of the invention;

FIGS. 8A through 8E illustrate method 600 for selling an item, according to an embodiment of the invention.

DETAILED DESCRIPTION OF THE DRAWINGS

The invention disclosed related to a trading method and system that implements a new concept for buying and selling products and other item at a future time at a reduced price through futures contracts, forward contracts, or like contracts. The trading method and systems are innovative in executing a contract to purchase an item subject to the condition of availability. A customer may mark, for example, the products he desires in different stores and then enters a website, in which he is invited to enter contract for them, taking the risk that the products contracted for will be sold and the contract will be void.

There are three important aspects to the trading systems and methods—
  a. A financial instrument—contracts on a future sale of an item;
  b. A process of buying the item via line of contracting users; and
  c. A website in a form of a mall of stores in which the trading and tracking are executed.

It is noted that any embodiment of the invention may implement some or all of those aspects, as well as other aspects discussed below.

Figure 1A:
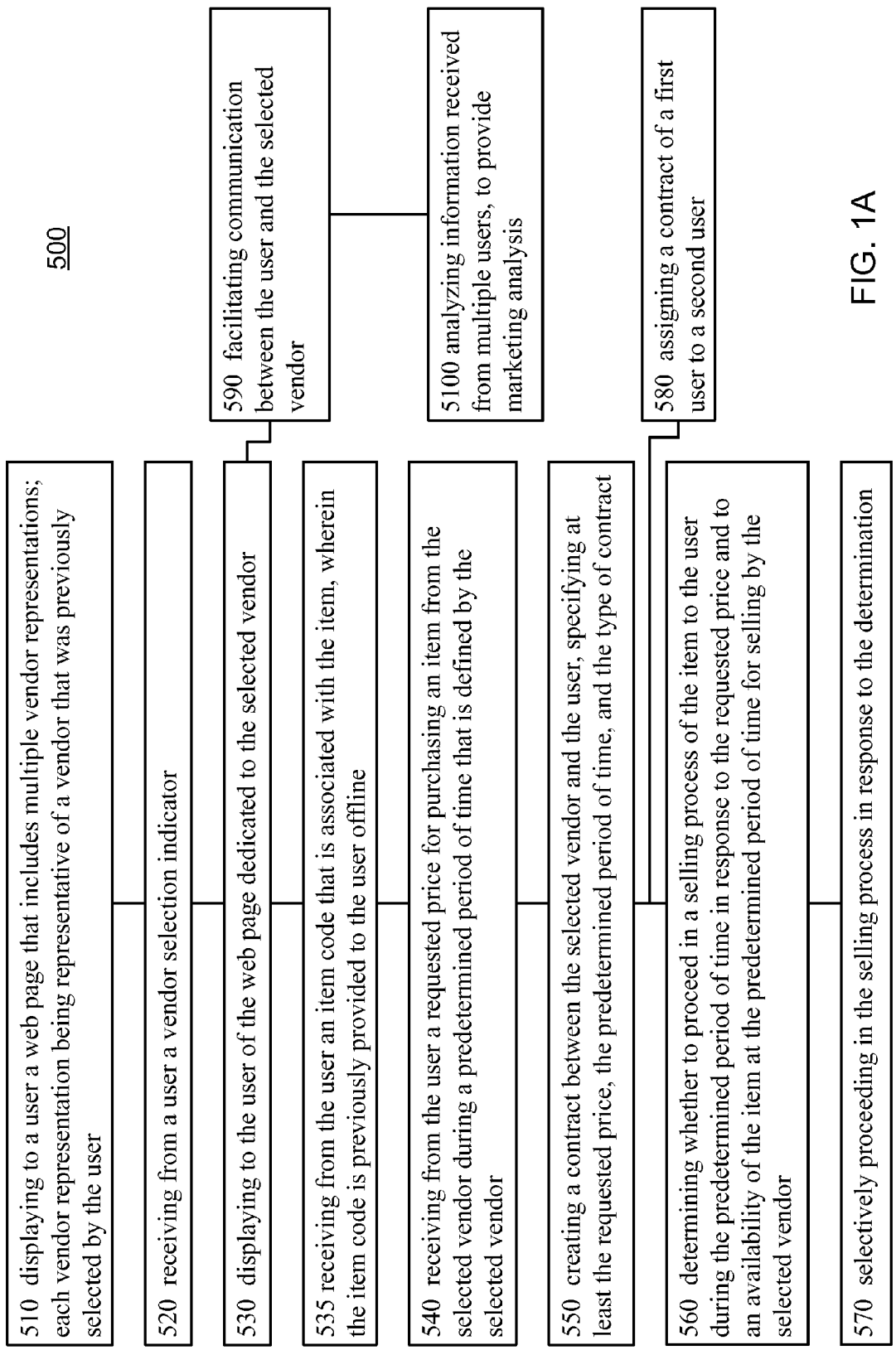

FIGS. 1A through 1F collectively illustrate method 500 for selling an item, according to an embodiment of the invention, wherein FIGS. 1B through 1F illustrate additional stages included in some of the stages disclosed in relation to FIG. 1A. It is noted that conveniently method 500 is carried out by a server or a group of servers that are adapted to read a computer readable medium having a computer readable code embodied therein, wherein different embodiments of the computer readable code include instructions for implementing different embodiments of method 500.

As will be clear from the following description, the item may be either tangible item (i.e. a product such as a clothing material, a car, and the like), or an intangible item (such as a service, an event entrance, a contract, and so forth); the item may refer for a selling or a rental (e.g. of a car, or a hotel room, wherein the term selling as used below also refer to a rental), and so forth. Additionally, it is noted that the item may be either singular, of a group of substantially similar items (e.g. a shirt of a certain size and color, a reservation for a specific hotel between given dates), or of a group of comparable items (e.g. hotel reservations in a certain area and of similar quality, etc.).

Pertaining to the selling or renting of items referred to as events, it should be noted that simple events are supported (e.g. "a flight on route AB on day T"—is regarded as simple event; it can be chosen from a list), while more complex events (e.g. "flight on route AB in May", a complex event may cover more than one simple events namely all flights on rout AB taking event in May) may also be supported.

Method 500 starts with stage 510 of displaying to a user a web page that includes multiple vendor representations; each vendor representation being representative of a vendor that was previously selected by the user. It is noted that the web page may be displayed to the user by different displaying means, such as a personal computer, a lap top computer, a personal digital assistant (PDA), a cellular phone, and so forth).

According to an embodiment of the invention, the displaying mean is located inside a store of a vendor, thus enabling the user to contract for the item when shopping. It should be noted that when the contracting takes place in a store, the operating may be carried out by a salesperson acting as the user, and the according to such an embodiment of the invention, stages 510 and 520 are usually not required, as well as occasionally stage 530.

Figure 2:
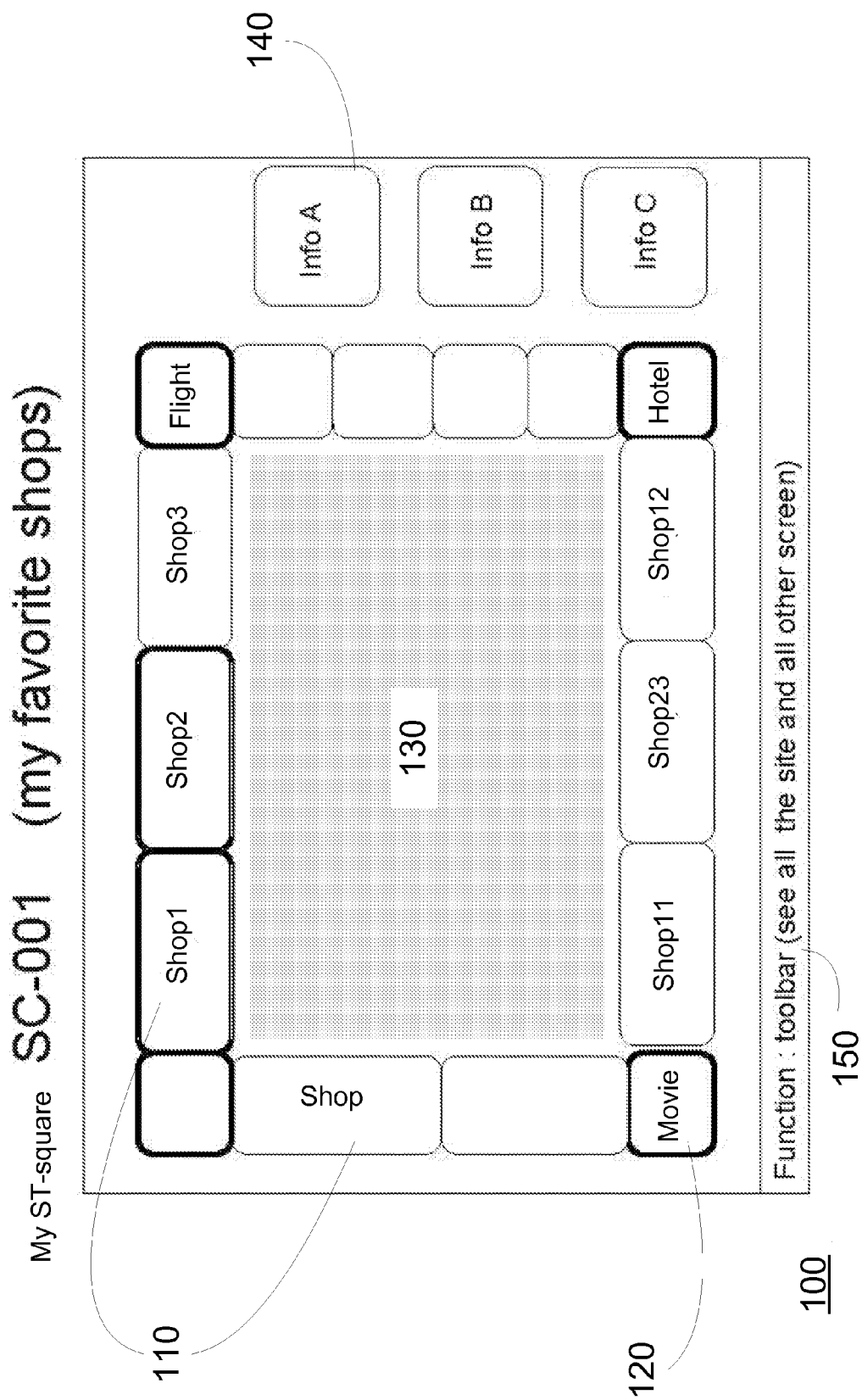
FIG. 2 illustrates a web page that includes multiple vendor representations, according to an embodiment of the invention.

Referring to stage 510, FIG. 2 illustrates web page 100 that includes multiple vendor representations 110, according to an embodiment of the invention. A selection by the user of each of the multiple vendor representations 110 will result in a displaying to the user of a web page dedicated to the selected vendor.

Web page 100 may further include additional components, such as item-type selection items 120 (e.g. for selecting looking for a flight, a hotel reservation, a movie, and so forth), information box 130 (that may include, for example, instructions, special deals, specific user related information, and so forth), additional information components 140 (the information of which or to which they refer may be responsive to an initial selection of a vendor representation 110, e.g. by single-clicking it, or hovering above it), toolbar 150, and so forth.

Referring again to method 500, conveniently stage 510 is preceded by selecting by the user of the multiple vendors (while it is noted that the web-page may include additional vendor representations or other selectable components not selected by the user), wherein the selecting of the multiple vendors may be carried out in different way. For example, the user may be acquainted with the vendor and look for it, may be offered additional vendors (e.g. by "similar vendors" feature), may reach the vendor via a specific item desired, and so forth.

It is noted that, according to an embodiment of the invention, the displaying of stage 510 includes displaying to the user the web-page that includes the multiple vendor representations, each vendor representation being representative of a vendor that belongs to a group of vendors, wherein the group of vendors is defined by an entity that is not the user, wherein the group of vendors was previously selected by the user (thus selecting the vendor representations of stage 510).

The group of vendors may be representative of a mall (for example, either including the vendors of an actual bricks and mortar mall, or a virtual mall of vendors selected, e.g. by another user, which may and may not be acquainted with the user) that was defined by another user, or by another entity having interests in offering its selection of group of vendors to other users (usually, if not a private user, those would be commercial interests, but other interests like the promotions of vendors associated with an agenda such as fair-trade may also be applied).

It is noted that the selection of groups of vendors may be either by identifying the groups of vendors or the entity that have created or which shares the group of vendors with other user, or alternatively by searching (and possibly reviewing) multiple groups of vendors, to select one or more groups of vendors which are of interest to the user. This way, not only isolated vendors can promote themselves or further the selling of their own items, but furtherance and promotions of groups of vendors (either by vendors of the group or by external entities) may be facilitated.

Conveniently, the sharing of groups of malls between users may become a prominent feature of trading according to the invention, wherein users—either nationally or internationally—can share (and recommend) groups of malls between themselves, wherein the sharing of the group of malls between users may be leveraged as a profit maker not only for the vendors, but possibly also to the users themselves (e.g. by getting better deals for a group of users which share a group of malls, by being rewarded for other users using the group of vendors created by whom, etc.). It should be noted that other aspects of sharing groups of vendors are discussed below, in relation to ST-squares described ab hinc.

Stage 510 is followed by stage 520 of receiving from a user a vendor selection indicator; indicating which vendor the user selected (by selecting a vendor representation of which). It should be clear that different types of vendors may be selected, according to different embodiments of the invention, such as store owners, manufacturers, importers, airlines, hotels, service providers, and so forth.

The receiving of stage 520 is conveniently followed by stage 530 of displaying to the user of the web page dedicated to the selected vendor, wherein according to an embodiment of the invention, the web pages dedicated to the selected vendors are designed by a template of the web-site, so as to conform the vendors to standards and business methods of the web-site. Clearly, different template may be used for different types of vendors (i.e. a hotel reservations vendor may use a different template than a fashion store), though significant similarities may still be common to the different template.

The web page dedicated to the selected vendor conveniently display to the user items of the vendor which are offered for sale, subject to availability for selling by the selected vendor, and the predetermined dates (or predetermined periods of time) designated for the selling of each item (if still available). Those predetermined dates and/or predetermined periods may be associated, by way of example, to a predetermined date of end-of-season sale (or ending thereof, intending to sell surplus amount of item not sold), to a last-minute travel tickets or hotel reservations, and so forth. It is noted that, according to an embodiment of the invention, the user may be able to reach a specific item via the first web-page (which includes the multiple vendor representations) by entering an item code, e.g. received at a store of a vendor, etc.

According to an embodiment of the invention, stage 530 further include stage 531 of displaying to the user decision related information, which may be used by the user when suggesting a requested price for the item. Such information may include, by way of example, the retail price of the item, information pertaining to requested prices of other users or statistics relation thereto, minimum bidding price, terms of providing the item and of bidding on which, and so forth.

According to an embodiment of the invention, method 500 continues with stage 535 of receiving from the user an item code that is associated with the item, wherein the item code is previously provided to the user off-line. That is, the user may, for example, find the item while shopping in a bricks and mortar store, and not willing to purchase the item for it's full price, it may receive at the store a ticket stating the item code associated with the item. Thus, when entering the web-site, the user needs only to enter the item code (or alternatively open an item code link sent to him from the store by e-mail or SMS, etc.) in order to bid for the item. It is noted that, according to an embodiment of the invention, the receiving of the item code from the user may also count as the receiving of stage 520, but this is not necessarily so. Clearly, the item code may be provided to the user in stores other than that of the item, as well as other commercial situations like promotions, etc.

Additionally, according to an embodiment of the invention, the item code is previously provided to the user on-line rather than off-line, e.g. at another web-site (e.g. of the vendor), or as an electronic coupon.

Method 500 continues with stage 540 of receiving from the user a requested price for purchasing an item from the selected vendor during a predetermined period of time that is defined by the selected vendor, and which is associated with the item (as clearly, different items of the selected vendor may be associated with different periods of time). It is noted that the predetermined period time may be indicated as a date, an hour, or a period of time between two points in time, wherein the period of time may be further associated with a selling policy (of the selected vendor, of the web-site, or a combination thereof).

The method conveniently supports at least two types of receiving a requested price from the user; one of which that is binding, and the other that is non-binding. According to an embodiment of the invention, stage 540 includes stage 541 of receiving from the user a binding requested price; according to an embodiment of the invention, stage 540 includes stage 542 of receiving from the user a non-binding requested price.

It is noted that, according to an embodiment of the invention, the receiving of the requested price includes stage 543 of receiving from the user a request for purchasing the item from the selected vendor during the predetermined period of time at a predetermined item price that is defined by the selected vendor. That is, the selected vendor may offer for it clients to contract for buying the item, if still available, at the predetermined period of time (e.g. an end of season sale), at the predetermined item price, which is usually significantly lower than the retail price.

Generally, method 500 relates to at least two types of futures contracts (or forward contracts) relating to a selling of the item to the user (also referred to as the customer); those contracts are contracts committed to by the user for a specific item (M), a requested price (P) and for a future predetermined period of time (T). Both of the types of contract herein referred to are conditional contracts, in that the contract is only to be executed (and for a binding contract also binding) only if the item is available on the predetermined period.

The first type of contract is a binding contract, in which a binding requested price is received from the user (this type of contract is also referred to as Buy-me (BM) contract) for committing to buy the item at the requested price at the binding requested price (which may also be, as mentioned above, a predetermined item price determined by the selected vendor), at the predetermined period. In return, the user can be assured that if the item is still available at the predetermined time, the user will receive it (which may also be object to a place of the user in a line of users, as will be detailed below). It is noted that binding contract usually implement a "credit on condition" scheme, which is detailed below.

Additionally, referring to end of seasons sale for example, the user is not required to keep track of all the items desired for purchasing in a reduced price and for looking for those item at different sales of different vendors; if the user wishes to purchase the item in a requested price, it is now possible for the user to place a requested price and to wait for a result pertaining to an availability of the item for selling by the selected vendor at the predetermined period, without required additional steps like looking for sales of the item.

According to an embodiment of the invention, a binding contract substantially includes the following details: (a) a selling price (should a selling occur); (b) the predetermined period; (c) a code identifying the item (M); (d) the selected vendor as a seller; (e) a method of notifying the user about availability of the product on the predetermined period (e.g. e-mail, SMS, phone message, etc.); (f) manner of delivering the item (if required) to the user on the predetermined period T (e.g. a personal delivery or a shipment to an address); (g) a time range (X) for charging the contract (e.g. charging of the user will be made on day T+X). Thus, if the item M is available and can be delivered to the user on T, then the binding contract is conveniently charged for day T+X. The user will usually receive notification during the predetermined period about the availability of the item, and thus of the purchasing of the item.

The second type of contract is a non-binding contract (also referred to as Mark-me (MM) contract), in which the user do not commit to purchase the item at a later time, but will be informed of the item, if available, and will be able to finalize a decision in a later time. This type of contract may also be implemented both to non-binding requested prices offered by the user, as well as for predetermined item price determined by the selected vendor, and may also be subject to a line of users, when multiple users which to non-bindingly contract for a future purchase of the item.

For the second type of contract, if the item is available at the predetermined period for non-obliged users (generally, it should be noted that at least for certain types of items, such as but not limited to hotel reservations), an availability of the item for selling by the selected vendor at the predetermined period may be determined prior to the predetermined period, wherein method 500 may still be applied, mutatis mutandis). It is noted that the contracts of method 500 only become valid if the item is available at the predetermined period.

It is noted that conveniently, the receiving of stage 540 includes stage 544 of receiving requested prices from multiple users. The requested price may be binding requested prices, and may be non-binding requested prices. Usually, stages 510 through 530 are carried out for all or some of the multiple users, wherein it is noted that other methods for receiving the requested prices from some of the users may be implemented, some of which are detailed below.

According to an embodiment of the invention, stage 544 includes receiving from at least one non-obliged user a non-binding requested price and receiving from at least one obliged user a binding requested price. As is detailed below, in such a case the obliged user are conveniently prioritized over non-obliged user, so that a non-obliged user can not be approached by the selected vendor for selling the item if not the selling of the item to all of the obliged users where not carried out before, regardless of the requested prices of any of the users.

Stage 540 is followed by stage 560 (stage 550 is described below) of determining whether to proceed in a selling process of the item to the user during the predetermined period of time in response to the requested price and to an availability of the item at the predetermined period of time for selling by the selected vendor. It is noted that, according to an embodiment of the invention, the determining is carried out substantially at the predetermined period of time, albeit it may also be carried out prior to the predetermined period of time, if the availability of the item at the predetermined period of time is known in advance.

The proceeding in the selling process may take different forms, such as authorizing a charging of the user for the item by a sum responsive to the binding requested price and suggesting to the user to buy the item at the non-binding requested price (usually depending on the type of requested price received from the user, which relates to the type of contract selected by whom, but may also depend on additional factors such as number of available items, availability of similar items, and so forth), and accordingly, the determining of stage 560 may also take different forms that correspond to the type of proceeding intended.

When requested prices are received from multiple customers, stage 560 conveniently includes stage 561 of determining whether to proceed in at least one selling process of the item to at least one user of the multiple users. The determining of stage 561 may also include determining the number of selling processes that should proceed, an order of the users for which the selling processes should be proceeded, and so forth.

When requested prices are received from multiple customers, stage 560 may also include stage 562 of determining whether to proceed in a selling process of the item to a certain user in response to requested prices received from other users. That is, according to an embodiment of the invention, the requesting users are order in a line (at least partly) by the order to the requested prices received from which, and the determining may be responsive to the number of users that offered a higher requested price than the user.

It is noted that conveniently, the proceeding in the selling process to non-obliged users is only carried out if the item is available after approving sells to all the obliged users, and thus there may be two lines, one for obliged users, and the other for non-obliged users, wherein the determining may be carried out accordingly.

Stage 560 is followed by stage 570 of selectively proceeding in the selling process in response to the determination. The proceeding may take different forms, some of which are detailed below.

According to an embodiment of the invention, stage 570 includes stage 571 of authorizing a charging of the user for the item by a sum responsive to the binding requested price. It is noted that stage 571 is carried out only for obliged user, and usually do not require additional approval from the user. The sum is conveniently the requested price to which postage & packing cost are added, as well as additional cost that may apply such as taxes. The sum to charge is conveniently provided to the user before the binding requested price is received.

According to an embodiment of the invention in which the receiving of the requested price includes receiving from the user the non-binding requested price, stage 570 includes stage 572 of suggesting to the user to buy the item at the non-binding requested price, wherein the selectively proceeding is further responsive to a reply of the user to the suggestion to buy the item. Usually the suggestion to buy the item at the non-binding requested price is limited in time, to enable a suggesting of the item to other non-obliged users (if any), should the user not accept the suggestion.

As aforementioned, according to an embodiment of the invention wherein the receiving of the requested price comprises receiving from at least one non-obliged user a non-binding requested price and receiving from at least one obliged user a binding requested price; the suggesting to one or more non-obliged users to buy the item at a non-binding requested price is conveniently carried out only if the item is available after approving sells to all the obliged users.

It is noted that, according to an embodiment of the invention, method 500 further includes stage 590 of facilitating communication between the user and the selected vendor, by way of either a formulated dialogue, or otherwise. Naturally, according to an embodiment of the invention, the user may support communication details and request to be contacted by a vendor's representative, or may contact the vendor according to given vendor communication details.

According to an embodiment of the invention, method 500 further includes stage 591 of enabling the selected vendor to offer the user a commercial offer, wherein the commercial offer is responsive to information previously received from the user. It is noted that the commercial offers made to the user (according, two distinctive periods of time are relevant, one is while the user is still waiting for a determination regarding to availability, and the second period follows a determining whether the user is eligible for the item or not). By way of example, the commercial offer may be an offer to join customers club of the selected vendor, an offer to purchase additional items, and so forth.

It is further noted that method 500 may further include collecting information pertaining to multiple bidding of the user at different times (e.g. when offering requested prices for different items of different vendors at different times), wherein the commercial offer may be responsive to information pertaining to multiple such biddings.

According to an embodiment of the invention, method 500 further includes stage 5100 of analyzing information received from multiple users, to provide marketing analysis. The marketing analysis pertains for example to the purchasing habits of multiple users, thus enabling to detect patterns in bidding for different types of items, and so forth.

It is noted that usually, a contract between the selected vendor and the user is created, indicating mutual obligation between the sides and for which the user should agree (the terms of the contract are substantially known to the selected vendor which takes part in the selling according to method 500). According to an embodiment of the invention, method 500 further includes stage 550 of creating a contract between the selected vendor and the user, specifying at least the requested price, the predetermined period of time, and the type of the contract (e.g. binding or non-binding). According to such an embodiment of the invention, the carrying out of stages 560 and 570 is conditioned by an acceptance of the user to terms of the created contract.

Referring to binding contracts (for which a binding requested price is received from the user), the binding contract is a binding contract between the user (also referred to as the customer) and the selected vendor that is offering the item, for the future purchase of an acknowledged specific item at the requested price (that may be either suggested by the customer, or a predetermined item price determined by the selected vendor) at the predetermined period of time; the binding contract usually indicates the specific conditions that the contract creates, and which are enforced only if the item is available (e.g. in a store, or is otherwise at the possession of the selected vendor and salable).

The predetermined period of time and the requested price at which the binding contract is executed are determined in advance, and a "credit on condition" contract is conveniently executed.

According to an embodiment of the invention, the period of time is an acknowledged end of season date or a date that the selected vendor decides in advance as the start of the sale. It can also be decided in a store of the selected vendor at the time of composing the binding contract, as well as indicated on the website. Notably, if the item is no longer available at the predetermined period of time (e.g. if the item is sold anteriorly) then the contract is void.

Conveniently, if the item is available and can be delivered to the user during the predetermined period (or at an accepted time afterwards), the binding contract is charged for X days following the predetermined period of time (X being the time range aforementioned). Conveniently, the user must receive notification within the predetermined period (e.g. on exactly day T) about the availability of the requested item.

Referring to non-binding contracts (for which a non-binding requested price is received from the user), the non-binding contract is a non-binding agreement to purchase a specific item (e.g. a service or a product) in the future, according to the requested price that is usually suggested by the user.

The non-binding contract is usually recorded on the website (or on a database accessible by which) in the line for the specific product. The position of the non-binding contract in the line is determined according to the requested price that is indicated by the user (or by the time of receiving the requested price, if it is a predetermined item price that is determined by the selected vendor). The lowest offer appears at the end of the line. If the selected vendor approaches a user (following the determining of stage 550), it will be according to the line, starting from the highest requested price to the lowest.

According to an embodiment of the invention, the non-binding contract will be executed starting from day H if the product is available in stock on date H. Day H is the day on which the store decides to clear the stock. By way of example, on date H the end of season sale has already ended and the selected vendor clears the stock. Significantly, the website will not permit, according to an embodiment of the invention, the selected vendor to notify non-obliged users about availability of the item for selling by the selected vendor before concluding sales to obliged user for the same item.

According to an embodiment of the invention, the selected vendor may contact the user through the website (or elsewhere, e.g. by SMS, e-mail, etc.), and the user then either approves or rejects the non-binding contract within a given time. The non-binding contract is executed if the requested price received from the user in the non-binding contract is acceptable to the selected vendor. Notably, the user waits in line to be contacted by the selected vendor and need not check upon the requested item (also such an option may be provided, according to an embodiment of the invention). Additionally, the user may choose not to respond the offer, e.g. if it had arrived too late, or if a substitute item was obtained in the meanwhile (e.g. a light reservation was already made elsewhere).

The date for contacting the user is conveniently created according to position of the user in the line. The selected vendor contacts the users in the line in order. Therefore the lower the requested price offered, the later will the user be contacted, compared with users at the top of the line. As such the chance that the user at the end of the line will receive the item is lower than that of the user at the top of the line According to an embodiment of the invention, a non-binding contract substantially includes (usually when completing the details on the website): (a) the requested price; (b) the predetermined period of time (H is the start of the sale to non-obliged users. it is noted that the predetermined periods of time for non-obliged customers may differ from those of obliged customers, and usually are later than the latter. The user is conveniently informed on the difference before choosing whether to oblige or not); (c) a code identifying the item; (d) the selected vendor as a seller; (e) a method for notifying the user about availability of the product on the predetermined period (e.g. email, SMS, telephone message); (f) a manner of delivery of the product (e.g. personal or shipment to an address); and (g) time range X for charging the contract.

Referring to contracts for an event type items (which are usually non-binding contracts, as the user may look for alternative solution, or may bid on several events), example for event type items are play tickets, flights, hotel rooms or any other product with "space available". The method conveniently includes providing to the user all the tools required to define the "event" item.

According to an embodiment of the invention, the user is also offered to denote the advance notification time for each event he is bidding for. This advance notification time may be required by the user in order to reach the event or to finalize a determination.

It is noted that contracts for event type items are similar to the general description described above, though few details are added in relation to which, which may be implemented in different embodiments of the invention. The explanation will be given for a simple event, but it is clear to a person who is skilled in the art that adapting the following to complex events is straightforward.

According to an embodiment of the invention, stage 540 further includes stage 545 of receiving from the user an advance notification time for the non-binding requested price (e.g. relating to the event selected).

Stage 550 conveniently includes for event type items creating a contract that includes the advance notification time, wherein the line of users may be responsive both to requested prices received from different user and to the advance notification times received therefrom. Conveniently, the line is presented in a transparent manner and is entrenched in agreement and articles (under business agreements); while it is noted that the same may also be implemented for other type of items as well.

When the predetermined period of time approaches, a user whose advance notification time is longer than the time remaining until the event will be disqualified (i.e. will be deleted from the line). Users whose advance notification time is sufficient will be presented to the selected vendor according to the order of the line.

Taking into account the previous clause (i.e. insufficient advance notification time), the line will conveniently be presented to and handled by the website according to the requested prices. The user suggesting the highest requested price will receive the first right to receive the event time item, whilst it is noted that the time to respond to such an offer to the event is usually relatively short.

Referring again to FIG. 2, web page 100 is usually part of a larger web-site, facilitating the carrying out of method 500, and which is usually supported, stored, and/or managed by the aforementioned server or group of servers. A description of the web site, according to different embodiments of the invention, follows. Clearly, not all of the features must be implemented in any embodiment of the invention.

It is noted that, according to an embodiment of the invention, the web-site is designated to represent a mall, the stores of which refer to multiple vendors, and are selected by each user independently. Therefore, the web site conveniently supports a displaying of a different "mall" for every user or group of users.

For the first time the user will have at his disposal a rich library of vendors and malls from around the world. The user manages his purchases from the mall of vendors (also referred to as ST-Square, or plainly square, see also representation in FIG. 2). The user can build a special homepage and establish a "personal ST-Square" (such as the one illustrated in FIG. 2), that includes the stores or vendor which the user prefers. It is noted that a user may have more than one square, e.g. a square dedicated to shoes, a square dedicated to NY vendors, and so forth.

Different types of ST-Squares may be implemented: personal, public, real and virtual. The ST-Square includes K vendor representations representing K vendors out of N vendors. The K vendors are typically the user's favorites. The total list of vendors in the website club contains N vendors. The personal ST-Squares can be transferred, according to an embodiment of the invention, from one user to another thus enabling a creation of a global buying experience.

Vendors preferences of users from around the world may be sent from one to the other and thus assist one another with the buying process. Each vendor has an information card that includes the main and sub categories of the vendor, making it easier to find items of the vendor. Additional information that the vendor may update may include dates of end of season sales, special offers, and links to its website etc.

The website allows the user to easily shop in stores (virtual stores associated with different venders and reachable via the vendor representations located in ST-Square's, for example). The website and ST-Square conveniently include all the tools for creating the contracts within minutes. The contract is written with the minimum of steps and without distraction. The web site conveniently facilitates all the steps of the process manageable by the user: writing the contract, tracking the contract, receipt of messages, payment, and examining if the store is worthwhile and fair.

Once "entering" a store of a vendor in ST-Square, the user may then insert a code sequence in order to reach a contract on his specific item.

Alternatively, all the above functions can be executed from a simple list of all vendors (e.g. the screen referred to as screen Sc-Shops 002 in FIG. 3)—a web page that includes the whole list of the N club vendors in sequence and includes tools for sorting.

FIG. 3 illustrates a list of some of the screens of the website, according to an embodiment of the invention, wherein the term Konoshop refers to a list of items and codes of several items of a vendor. The "Konoshop" allows the vendor to present several products with prices and allows the user to shop at Konoshop. Also it helps to examine codes or to order products similar to those tried from the store. Significantly, the "Konoshop" is not the store website but rather a "small limited store" covered within the website. All Konoshops are conveniently of the same format suggesting the same view and functions.

Non-binding contracts on events can also be made using the list of the events that serve as a Konoshop. The vendors can present lists of events: "Plays at the theater on date X", "list of flights" and other products of suppliers. Buying products in "Konoshop" is possible like in any sales website on the internet which requests payment subject to the articles in the website. Should the user be interested in executing a non-binding contract, he may select an item from the list in "Konoshop" and continue in writing a contract.

Referring now again to FIG. 2, that illustrates web page 100 that includes multiple vendor representations 100, according to an embodiment of the invention, forming an ST-square. The ST-Square is the heart of the system and the lively and efficient place for shopping. The total list of the N vendors appears in a list (table) in another screen (referred to as screen Sc-Shops 002). Sorting, choosing and building a new ST-Square are functions of Sc-Shops 002.

The user usually reaches a store using the computer's mouse and once inside the store, he can easily reach all functions related to buying the items. When positioned outside the store, the user receives all general information "INFO" related to the site activities. In the center of ST-Square the customer can find the list of his existing items (former contracts). Each item in this list is a link to the Sc-003 screen that details the specific item line. Alongside the ST-Square the user can view a "small info screen", "INFO", meant to assist him with his buying.

Referring to additional information components 140 described above, according to an embodiment of the invention, information is displayed on the INFO screen and alongside the vendor representations. Information pertaining to a vendor may include vendor details, vendor grade (profitability, fairness). General information may include comparative indicators between vendors, website messages, overall list of items, search mechanism for item and vendor, etc.

Pertaining to the vendor's detail, the vendor may conveniently update information independently. A user who enters the website views the information while he is in the store of the vendor or when operating the functions of the surrounding screen. Information may include address, phone numbers, and links to the vendor's website, video clips, pictures, and list of items.

Pertaining to vendor grade comparative indicators, according to an embodiment of the invention, the website calculates and displays indicators for the whole store according to different criteria. In addition, the website presents comparative indicators of the store in relation to the average.

Some Functions that are supported from web-page 100 are, for example, selecting a specific ST-Square and updating ST-Square s; execution contracts and move to purchase the item in "Konoshop"; updating and paying for the contracts; notification and instructions to the user; transfer to designated screens of response, notice board, game, etc.; and forwarding ST-Square to another user.

It is noted that, according to an embodiment of the invention, sharing of ST-squares between users is facilitated (e.g. by displaying to a first user a web page that includes multiple vendor representations; each vendor representation being representative of a vendor that was previously selected by a second user, which shares his ST-square with the first user).

One or more ST-squares may also be shared by a community of users (e.g. each of the user may access an ST-square of another user of the community, or alternatively one or more ST-squares which are generated by one or more users serve the entire community, wherein some users are not required to make their own vendors selection. It is noted that a selecting of an ST-square of another user may suffice for the previous selection of the vendors referred to in stage 510).

It is further noted that commercial businesses (such as vendors, owners of bricks and mortar malls, etc.) may make their own selection (e.g. selecting vendor representations of vendors that have stores at a successful bricks and mortar mall), thus enabling customers to continue the shopping experience in their premises also when online, for a different and distinctive purchasing experience.

Referring now to the store management screens denoted in FIG. 3 (store management screens Sc-009-Sc-010); the some or all of the following functionalities may be offered, according to different embodiments of the invention: The vendor has tools for responding and conducting dialogues with the users; The vendor has access to every stage in the processes and methods herein described; The vendor has tools to respond, approve, submit for payment, notify about date and describe an item out of stock; 4. The vendor approves the contracts and receives payment from the user; The vendor has tools to replace a clip or picture or data delivered to the website; The vendor can update a list of products (for the "Konoshop"); The vendor can track and issue reports and notification as described elsewhere.

As aforementioned, different indicators may be assigned, both to vendors and to users, such as indicators of fairness, and indicator of profitability. According to an embodiment of the invention, the articles of the website will set a scale of values for the sellers and buyers; breaches of the articles by the vendor or user will be reflected in the fairness score. The articles are subject to business considerations and will define the scale while giving penalties for obligations that were not upheld or repeated violations of laws.

Examples are when the vendor invites the user to come for his item and the user arrives but does not find the specific item; A user who registers in line for many non-binding contracts, but never buys.

As for indicators of profitability, the articles of the website will present to the buyers the method for calculating the profit when buying. The method may change due to business considerations. The objective of the indicator is to provide the user with profit when making the purchase compared with the original price. In the absence of the original price the method will operate business or average considerations or any method that will be presented transparently in order to calculate the relative profit indicator.

The aim of the method, according to an embodiment of the invention, is to provide the customers with a sense of a buying game that offers excitement while buying. The indicators also serve for business considerations for the website. The intention of the method is to operate only in stores that are profitable to the customer and the store. Both sides must benefit hence a profitable store is a store that sells to the line. A vendor may opt not to enter the "game".

Referring again to FIG. 1, according to an embodiment of the invention, method 500 further includes stage 580 of assigning a contract of a first user to a second user, wherein the assigning conveniently follows a selling of the contract by the first user to the second user. The selling of contracts is an aspect of the invention that may be implemented in different embodiments of the invention.

The concept of buying, clearing stock, and responding to users will be preserved while business considerations are taken into account. The selling of contracts presents to its users the challenge of searching for surplus stock at low price. The contracts will be tradable (similar to stock exchange) in the future and will create a stock exchange of buyers and sellers. The selling of contracts is meant to expand once the global user and contract base become stable. The tools, form of payment and surprises will be formulated according to business considerations. All the tools will join to create an exceptional buying experience for the website's user base.

The global process will be driven by users who grow accustomed to receive surplus items in a managed and organized manner. As the global process grows, the buying habits will change. The excitement will continue to occur in the store.

However, around the gamble and risk-taking, users of the website will be able to enjoy a buying experience and vendors' 'courting'. They will continue managing their purchases with patience.

According to an embodiment of the invention, the vendors included in the website club receive points and responses from the audience that are summarized in a score. Some of the responses are meant for grading and comparing between stores and some are meant for marketing information for the store.

The format of responses will be mainly tabular and will include, by way of example: Complaints, Compliments, Recommendations, and Other fields. The information will be channeled to the vendors and its owners and will provide them with feedback about the users. The website will publicize some of the responses according to business considerations and consent. In addition, the summarized information that is pooled in the website will allow its consumers to draw general conclusions that will be publicized in such a way as to not infringe on the privacy of the users and the stores and subject to their prior consent.

Referring to screen Sc-006, denoted in FIG. 3, it will include tools to accept a response, respond, etc. All the tools and emails will be displayed in an obligatory format and their content will be polite and respectful. Templates may be provided for uniform language and response norms for complaints.

According to an aspect of the invention, a game is disclosed, in which The ST-Square allows the users to move between the stores. Among the stores in ST-Square there will be areas meant for operation: surprises, messages, contribution to the community. During the course of buying the website users will be awarded prizes in various forms including points or items (Sc 008).

FIG. 4 illustrates actions relating to binding contracts in the website, according to an embodiment of the invention. The different stages in the process disclosed in FIG. 4 are incorporated herein by reference.

According to an embodiment of the invention, a refreshing of binding contract is supported. A vendor can send to a user a notification about an item following the predetermined period of time. In this case the user must decide if to accept it. The binding contract is not binding after the predetermined period. (Conveniently, this obliged user gets an option to answer the offer before non-obliged users, because he was waiting to the item. The vendor finally got the item and he is the first to get the offer before non-obliged users).

FIG. 5 illustrates scenarios in executing binding contracts, according to an embodiment of the invention. A contract can be executed according to all the laws of the process but violations can occur from both sides. The vendor must abide by the agreement otherwise this is a violation of the contract and the obligation to the website and the user. The website gives positive scores for execution and penalizes for violations of the agreement.

Terms which are used in the description of the different scenarios of FIG. 5 are:

a. Product match code—indicates that the item supplied matches the marked product;
b. Message given on day T—indicates that message about the availability of the item is given to the website and to the user during the predetermined period of time;
c. Product delivered on day T—indicates that delivery in a store of the vendor to the user who was asked to come to the store;
d. Shipped on day T—indicates that the item was shipped to the user who requested the item shipped to him;
e. The store charges on day T+X—indicates that the charge by the vendor is made several days (the time range) after the item is delivered; and
f. Delivery in store—indicates that the item is given to user in the store.

The different scenarios 1-10 in executing binding contracts are, according to an embodiment of the invention:

1. The contract is executed as agreed: item match, message, delivery in the store and charge on time.
2. The contract is executed as agreed: item match, message, shipment, and charge on time.
3. Code does not match, the store charged the user even though it made a mistake. The website penalized the contract that was not executed causing the user inconvenience and loss. Delivery is done in store.
4. Code does not match—the store did not charge the user because of its error. The website penalized the contract that was not executed, causing the user inconvenience and loss. Delivery is done in store.
5. Code does not match—like 3 but regarding delivery by shipment.
6. Code does not match—like 4 but regarding delivery by shipment.
7. Contract executed as agreed. User wishes to cancel and uses consumer laws in his favor. The contract receives positive grade.
8. Like 7, delivery by shipment
9. No message on day T—the store violated the agreement and charged the user in contravention of the agreement. The user can renege on the contract with the credit card company and receive his money.
10. Store ensured the contract was refreshed.

FIG. 6 illustrates actions relating to non-binding contracts in the website, according to an embodiment of the invention. The different stages in the process disclosed in FIG. 6 are incorporated herein by reference.

FIG. 7 illustrates scenarios in executing non-binding contracts, according to an embodiment of the invention. A contract can be executed according to all rules of the process but violations may still transpire on both sides. The vendor must be sure to abide by the agreement otherwise this is a violation of the contract and the vendor's commitment to the website and to the user.

Terms which are used in the description of the different scenarios of FIG. 7 are:

a. Product match code—the item supplied matches the marked item;
b. Message given on day H1—message about the availability of the item is sent to the website; the user pays and the item is his, starting from the day of payment and subsequently delivery on H2. Generally H2 is a day following the message.
c. Product delivered on day H2—the user paid, after which the product is his.
d. Shipped on day H2—the user paid, after which the product is shipped.

e. The store charges on day H2+X—the charge by the vendor is made several days (the time range) after the product is delivered.

The different scenarios 1-8 in executing non-binding contracts are, according to an embodiment of the invention:
1. The contract is executed as agreed: item match, message, delivery in the store and charge on time.
2. The contract is executed as agreed: item match, message, shipment, and charge on time
3. Code does not match, the vendor charged the user even though it made a mistake. The website penalized the contract, which was not executed causing the user inconvenience and loss. Delivery is done in store.
4. Code does not match—the vendor did not charge the user because of its error. The website penalized the contract, which was not executed, causing the user inconvenience and loss. Delivery is done in store.
5. Code does not match—like 3 but regarding delivery by shipment.
6. Code does not match—like 4 but regarding delivery by shipment.
7. Contract executed as agreed—user wishes to cancel and uses consumer laws in his favor. The contract receives positive grade.
8. Like 7, delivery by shipment FIGS. 8A through 8E illustrate method 600 for selling an item, according to an embodiment of the invention, wherein FIGS. 8B through 1E illustrate additional stages included in some of the stages disclosed in relation to FIG. 8A. It is noted that except the initial stage 640 of receiving, method 600 is substantially similar to method 500, and may be carried out by the same server or group of servers. Additionally, as will be clear to a person who is skilled in the art, method 500 and 600 could be combine to process together requested prices received according to stage 540 of method 500 with those received according to stage 640 of method 600.

Method 600 starts with stage 640 of receiving from a vendor computer of a vendor a conditional purchase request that includes: (a) customer identification information; and (b) a requested price for purchasing an item from the vendor during a predetermined period of time that is defined by the vendor. It should be noted that the customer is conveniently a customer of a store (or other premises) of the vendor, and is comparable with the user of method 500, so that stages of method 500 that applies to the user may be applied to the customer of method 600.

Method 600 enables the customer to register a conditional purchase request for the item while still in the store, those both saving the customer time and avoiding negligence, and assist the store in selling all the available items, keeping conditional purchase requests of customers that would most likely otherwise desert the store without making any purchase. The customer identification information is used to identify and to contact the customer at least at the stage of selectively proceeding in the selling process.

It is noted that the vendor computer may be any computational device substantially located at a store or other selling location or premises of the vendor, and may take the form of a personal computer, an electronic cash register, a portable computational device such as PDA, a dedicated device, and so forth. According to an embodiment of the invention, the vendor computer is connected to a credit card reader, for receiving credit card details of the customer, wherein the conditional purchase request includes at least some of the credit card details of the customer.

According to an embodiment of the invention, stage 640 includes stage 641 of receiving from the vendor computer a conditional purchase request that includes a binding requested price; according to an embodiment of the invention, stage 640 includes stage 642 of receiving from the vendor computer a conditional purchase request that includes a non-binding requested price. Conveniently, the binding and the non-binding requested price are used for the creation of either a binding or a non binding contract respectively at stage 650, in a manner similar to that discussed in relation to method 500.

According to an embodiment of the invention, stage 640 includes stage 643 of receiving from the vendor computer a conditional purchase request for purchasing the item from the vendor during the predetermined period of time at a predetermined item price that is defined by the selected vendor.

According to an embodiment of the invention, stage 640 includes stage 644 of receiving requested prices from multiple users (wherein the customer is one of the users), wherein the requested prices may be all received from customers via vendor computers, or alternatively, some of the requested prices may be received via the web site, as disclosed in relation to method 500, and especially in relation to stages 510, 520, 530, and 540 thereof.

According to an embodiment of the invention, stage 640 includes stage 645 of receiving from the vendor computer a conditional purchase request that includes an advance notification time for the non-binding requested price.

According to an embodiment of the invention, stage 640 is followed by stage 650 of creating a contract between the vendor and the customer, specifying at least the requested price, the predetermined period of time, and the type of contract. It is noted that stage 650 is conveniently substantially equivalent to stage 550 of method 500.

Method 600 continues with stage 660 of determining whether to proceed in a selling process of the item to the customer during the predetermined period of time in response to the requested price and to an availability of the item for selling by the selected vendor at the predetermined period of time. It is noted that stage 660 may include stages 661 and 662 that are substantially equivalent to stages 561 and 562 of method 500, respectively.

Stage 660 is followed by stage 670 of selectively proceeding in the selling process in response to the determination. It is noted that conveniently, the selectively proceeding is responsive to the customer identification information, and especially in non-binding contracts, where the customer must be contacted for the selling to take place.

According to an embodiment of the invention, stage 670 includes stage 671 of authorizing a charging of the customer for the item by a sum responsive to the binding requested price, wherein it is noted that stage 671 is conveniently substantially equivalent to stage 571 of method 500.

According to an embodiment of the invention, stage 670 includes stage 672 of suggesting to the customer to buy the item at the non-binding requested price, wherein the selectively proceeding is further responsive to a reply of the customer to the suggestion to buy the item. It is noted that stage 672 is conveniently substantially equivalent to stage 572 of method 500.

It is noted that method 600 may further include stages 680 and 690 that are substantially equivalent to stages 580 and 590 of method 500, respectively. Additionally, method 600 may further include stage 691 of enabling the vendor to offer the customer a commercial offer, wherein the commercial offer is responsive to information of the conditional purchase request, which is substantially equivalent to stage 591 of method 500.

Additionally, according to an embodiment of the invention, method 600 further includes stage 6100 of analyzing information received from the multiple customers, to provide marketing analysis, which is substantially equivalent to stage 5100 of method 500.

It is noted that the invention also supports receiving a requested price from a user that uses a vendor website that is not the aforementioned website. That is, the user may surf another website (referred to as the vendor website) that offers the customer to purchase item online. However, in cases in which the customer does not wish to buy the item at the retail price, and wishes to contract for buying the item at the predetermined period subject to conditions of availability of the item for selling at the predetermined period, the customer may use a user interface of the vendor website (that may offer items of more than one vendors) to transmit a conditional purchase request.

For example, the customer may press a "buy me later" button on the vendor website, and receive a user interface for finding out about the predetermined period of time and other material pertaining to the future sale, for entering and/or confirming the requested price, for selecting the type of contract, and so forth. It is noted that if the customer have previously authenticated to the vendor website, some customer details may be included in the conditional purchase request without having to be manually entered by the customer.

Thus, according to an embodiment of the invention, stage 640 further includes stage 646 of receiving the conditional purchase request from a vendor computer that is associated with a vendor website; wherein the vendor website is adapted to receive from a user at least a portion of the content of the conditional purchase request by a user interface of the vendor website.

Figure 9:
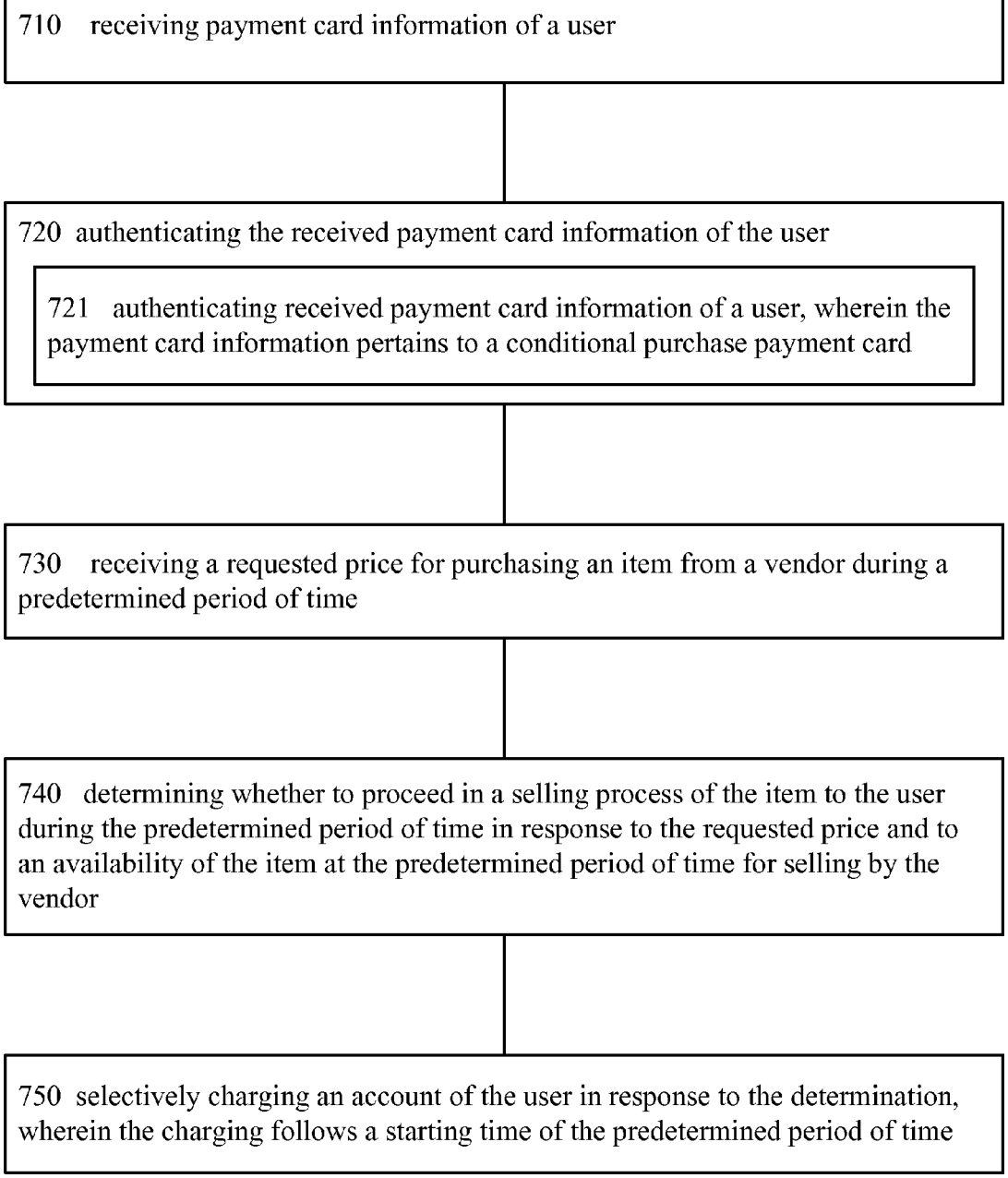
FIG. 9 illustrates a method for charging a payment card, according to an embodiment of the invention.

FIG. 9 illustrates method 700 for charging a payment card, according to an embodiment of the invention. Method 700 enables supporting conditional purchase transaction, in which the transaction is only carried out much after the conditional purchase is contracted for, and subject to a condition of availability of the conditionally purchased item at a predetermined period of time for selling by a vendor. It is noted that different embodiments of method 700 may be carried out by different participants in the selling and charging process, such as the web site discussed in relation to method 500, and by a payment card company.

It should be noted that method 700 may be implemented to different types of payment cards, such as (though not limited to): Credit card; Debit card; Charge card; Stored-value card; fleet card; Gift card; Electronic purse, and so for.

Method 700 conveniently starts with stage 710 of receiving payment card information of a user. The receiving is usually carried out at a store of a vendor (e.g. by a payment card reader, or manually), or by a website (such as the website of method 500 and the vendor website of method 600), also other means may be implemented in other embodiments of the invention.

Method 700 continues with stage 720 of authenticating the received payment card information of the user, e.g. according to standard authentication process known in the art.

Stage 720 is followed by stage 730 of receiving a requested price for purchasing an item from the vendor during a predetermined period of time. It is noted that the receiving of stage 730 is comparable to the receiving stages of methods 500 and 600.

Stage 730 is followed by stage 740 of determining whether to proceed in a selling process of the item to the user during the predetermined period of time in response to the requested price and to an availability of the item at the predetermined period of time for selling by the vendor.

Stage 740 is followed by stage 750 of selectively charging an account of the user in response to the determination, wherein the charging follows a starting time of the predetermined period of time.

It is note that, according to an embodiment of the invention, the payment card is a conditional purchase payment card, which is issued for users especially to facilitate conditional purchases (albeit usually supporting other types of charging, such as the different prior art charging schemes). In such a case, method 700 may be either limited or not limited to conditional purchase payment cards. Especially, according to an embodiment of the invention, stage 720 includes stage 721 of authenticating received payment card information of a user, wherein the payment card information pertains to a conditional purchase payment card.

Generally, it is noted that different embodiments of method 700 may support different embodiments of methods 500 and 600, and that adaptations of methods 500 and 600 may be applied to method 700 mutatis mutandis, even if not explicitly elaborated.

According to an aspect of the invention, a first computer readable medium having first computer-readable code embodied therein for selling an item. It is noted that the first computer readable code conveniently includes instructions for the carrying out of method 500 and of different embodiments thereof, and that aforementioned embodiments of method 500 may be implemented in the first computer readable code, even if not explicitly elaborated herein.

The first computer-readable code includes instructions for: (a) displaying to a user a web page that includes multiple vendor representations; each vendor representation being representative of a vendor that was previously selected by the user; (b) receiving from a user a vendor selection indicator; (c) receiving from the user a requested price for purchasing an item from the selected vendor during a predetermined period of time that is defined by the selected vendor; (d) determining whether to proceed in a selling process of the item to the user during the predetermined period of time in response to the requested price and to an availability of the item at the predetermined period of time for selling by the selected vendor; and (e) selectively proceeding in the selling process in response to the determination.

According to an embodiment of the invention, the instructions included in the first computer readable code for receiving the requested price further include instructions for receiving from the user a request for purchasing the item from the selected vendor during the predetermined period of time at a predetermined item price that is defined by the selected vendor.

According to an embodiment of the invention, the instructions included in the first computer readable code for receiving the requested price further include instructions for receiving from the user a binding requested price, wherein the selectively proceeding includes authorizing a charging of the user for the item by a sum responsive to the binding requested price.

According to an embodiment of the invention, the first computer readable code further includes instructions for assigning a contract of a first user to a second user.

According to an embodiment of the invention, the instructions included in the first computer readable code for receiving the requested price further include instructions for receiving requested prices from multiple users, wherein the determining includes determining whether to proceed in at least one selling process of the item to at least one user of the multiple users.

According to an embodiment of the invention, the instructions included in the first computer readable code determining further include instructions for determining whether to proceed in a selling process of the item to a certain user in response to requested prices received from other users.

According to an embodiment of the invention, the instructions included in the first computer readable code for receiving the requested price further include instructions for receiving from the user a non-binding requested price, wherein the selectively proceeding includes suggesting to the user to buy the item at the non-binding requested price, wherein the selectively proceeding is further responsive to a reply of the user to the suggestion to buy the item.

According to an embodiment of the invention, the instructions included in the first computer readable code for receiving the requested price further include instructions for receiving from at least one non-obliged user a non-binding requested price and receiving from at least one obliged user a binding requested price; wherein the suggesting to one or more non-obliged users to buy the item at a non-binding requested price is carried out only if the item is available after approving sells to all the obliged users.

According to an embodiment of the invention, the first computer readable code further includes instructions for receiving from the user an item code that is associated with the item and which is previously provided to the user off-line, prior to the receiving of the requested price.

According to an embodiment of the invention, the first computer readable code further includes instructions for enabling the selected vendor to offer the user a commercial offer, wherein the commercial offer is responsive to information previously received from the user.

According to an embodiment of the invention, the first computer readable code further includes instructions for analyzing information received from the multiple users, to provide marketing analysis.

According to an aspect of the invention, a second computer readable medium having second computer-readable code embodied therein for selling an item. It is noted that the second computer readable code conveniently includes instructions for the carrying out of method 600 and of different embodiments thereof, and that aforementioned embodiments of method 600 may be implemented in the second computer readable code, even if not explicitly elaborated herein.

The second computer-readable code including instructions for: (a) receiving from a vendor computer of a vendor a conditional purchase request that includes: (i) customer identification information; and (ii) a requested price for purchasing an item from the vendor during a predetermined period of time that is defined by the vendor; (b) determining whether to proceed in a selling process of the item to the customer during the predetermined period of time in response to the requested price and to an availability of the item at the predetermined period of time for selling by the selected vendor; and (c) selectively proceeding in the selling process in response to the determination.

According to an embodiment of the invention, the instructions included in the second computer readable code for receiving of the conditional purchase request from the vendor computer further include instructions for receiving the conditional purchase request from a vendor computer that is associated with a vendor website; wherein the vendor website is adapted to receive from the customer at least a portion of the content of the conditional purchase request by a user interface of the vendor website.

According to an embodiment of the invention, the instructions included in the second computer readable code for receiving of the conditional purchase request from the vendor computer further include instructions for receiving from the vendor computer a conditional purchase request for purchasing the item from the vendor during the predetermined period of time at a predetermined item price that is defined by the selected vendor.

According to an embodiment of the invention, the instructions included in the second computer readable code for receiving of the conditional purchase request from the vendor computer further include instructions for receiving from the vendor computer a conditional purchase request that includes a binding requested price, wherein the selectively proceeding includes authorizing a charging of the customer for the item by a sum responsive to the binding requested price.

According to an embodiment of the invention, the instructions included in the second computer readable code for receiving of the conditional purchase request from the vendor computer further include instructions for receiving from the vendor computer a conditional purchase request that includes a non-binding requested price, wherein the selectively proceeding includes suggesting to the customer to buy the item at the non-binding requested price, wherein the selectively proceeding is further responsive to a reply of the customer to the suggestion to buy the item.

According to an embodiment of the invention, the second computer readable code further includes instructions for enabling the vendor to offer the customer a commercial offer, wherein the commercial offer is responsive to information of the conditional purchase request.

According to an embodiment of the invention, the instructions included in the second computer readable code for receiving of the conditional purchase request from the vendor computer further comprise instructions for receiving conditional purchase requests from multiple customers, wherein the second computer readable code further includes instructions for analyzing information received from the multiple customers, to provide marketing analysis.

The present invention can be practiced by employing conventional tools, methodology, and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:
1. A method for selling an item, the method comprising:
receiving, by a server, from a vendor computer of a vendor
a conditional purchase request that comprises:
customer identification information that identifies a customer; and
a non-binding requested price for purchasing an item from the vendor during a predetermined period of time that is defined by the vendor; wherein the non- binding requested price does not bind the customer to purchase the item from the vendor during the predetermined period of time;

determining, by the server, whether to proceed in a selling process of the item to the customer during the predetermined period of time in response to the requested price and to an availability of the item at the predetermined period of time for selling by the vendor; and selectively proceeding in the selling process in response to the determination; wherein the selectively proceeding comprises suggesting to the customer to buy the item at the non-binding requested price, wherein the selectively proceeding is further responsive to a reply of the customer to the suggestion to buy the item;

receiving (a) at least one conditional purchase request that comprises a binding requested price and (b) at least one conditional purchase request that comprises a non-binding price; and prioritizing the (a) at least one conditional purchase request that comprises a binding price over the (b) at least one conditional purchase request that comprises a non-binding price; and completing each selling process related to the at least one conditional purchase request that comprises a binding price, before starting a selling processes related to a conditional purchase request that comprises a non-binding price.

2. The method of claim 1, wherein the receiving of the conditional purchase request from the vendor computer comprises receiving the conditional purchase request from a vendor computer that is associated with a vendor website; wherein the vendor website is adapted to receive from the customer at least a portion of the content of the conditional purchase request by a user interface of the vendor website; wherein the vendor computer is a personal data assistant (PDA).

3. The method of claim 1, wherein the receiving of the conditional purchase request comprises receiving from the vendor computer a conditional purchase request for purchasing the item from the vendor during the predetermined period of time at a predetermined item price that is defined by the customer.

4. The method of claim 1, further comprising receiving from the vendor computer a conditional purchase request that comprises a binding requested price, wherein the selectively proceeding comprises authorizing a charging of the customer for the item by a sum responsive to the binding requested price.

5. The method of claim 1, wherein the receiving of the conditional purchase request is followed by enabling the vendor to offer the customer a commercial offer, wherein the commercial offer is responsive to information of the conditional purchase request.

6. The method according to claim 1, comprising:
receiving multiple conditional purchase requests that comprise multiple non-binding requested prices;
ordering the multiple conditional requested based on values of the non-binding requested prices; and
approaching clients that sent the multiple conditional purchase requests according to the ordering.

7. The method according to claim 1, comprising:
receiving multiple conditional purchase requests that comprise multiple non-binding requested prices;
ordering the multiple conditional requested based on times of reception of the non-binding requested prices; and
approaching clients that sent the multiple conditional purchase requests according to the ordering.

8. A non-transitory computer readable medium having computer-readable code embodied therein for selling an item, the computer-readable code comprising instructions for:
receiving from a vendor computer a conditional purchase request that comprises:
customer identification information that identifies a customer; and
a non-binding requested price for purchasing an item from the vendor during a predetermined period of time that is defined by the vendor; wherein the non-binding requested price does not bind the customer to purchase the item from the vendor during the predetermined period of time;
determining whether to proceed in a selling process of the item to the customer during the predetermined period of time in response to the requested price and to an availability of the item at the predetermined period of time for selling by the vendor;
selectively proceeding in the selling process in response to the determination; wherein the selectively proceeding comprises suggesting to the customer to buy the item at the non-binding requested price, wherein the selectively proceeding is further responsive to a reply of the customer to the suggestion to buy the item;
receiving (a) at least one conditional purchase request that comprises a binding requested price and (b) at least one conditional purchase request that comprises a non-binding price;
prioritizing the (a) at least one conditional purchase request that comprises a binding price over the (b) at least one conditional purchase request that comprises a non-binding price; and
completing each selling process related to the at least one conditional purchase request that comprises a binding price, before starting a selling processes related to a conditional purchase request that comprises a non-binding price.

9. The non-transitory computer readable medium of claim 8, wherein the instructions comprised in the computer readable code for receiving of the conditional purchase request from the vendor computer further comprise instructions for receiving the conditional purchase request from a vendor computer that is associated with a vendor website; wherein the vendor website is adapted to receive from the customer at least a portion of the content of the conditional purchase request by a user interface of the vendor website; wherein the vendor computer is a personal data assistant (PDA).

10. The non-transitory computer readable medium of claim 8, wherein the instructions comprised in the computer readable code for receiving of the conditional purchase request from the vendor computer further comprise instructions for receiving from the vendor computer a conditional purchase request for purchasing the item from the vendor during the predetermined period of time at a predetermined item price that is defined by the customer.

11. The non-transitory computer readable medium of claim 8, wherein the instructions comprised in the computer readable code for receiving from the vendor computer a conditional purchase request that comprises a binding requested price, wherein the selectively proceeding comprises authorizing a charging of the customer for the item by a sum responsive to the binding requested price.

12. The non-transitory computer readable medium of claim 8, wherein the computer readable code further comprises instructions for enabling the vendor to offer the customer a commercial offer, wherein the commercial offer is responsive to information of the conditional purchase request.

13. The non-transitory computer readable medium of claim 8, wherein the instructions comprised in the computer readable code for:

receiving multiple conditional purchase requests that comprise multiple non-binding requested prices;

ordering the multiple conditional requested based on values of the non-binding requested prices; and approaching clients that sent the multiple conditional purchase requests according to the ordering.

14. The non-transitory computer readable medium of claim 8, wherein the instructions comprised in the computer readable code for:

receiving multiple conditional purchase requests that comprise multiple non-binding requested prices;

ordering the multiple conditional requested based on times of reception of the non-binding requested prices; and approaching clients that sent the multiple conditional purchase requests according to the ordering.

* * * * *